United States Patent
Dummersdorf et al.

[11] Patent Number: 6,048,508
[45] Date of Patent: Apr. 11, 2000

[54] PROCESS FOR OBTAINING CARBON MONOXIDE AND HYDROGEN

[75] Inventors: Hans-Ulrich Dummersdorf, Burscheid; Hans-Joachim Müller; Dieter Grenner, both of Leverkusen; Gerhard Moormann, Brunsbüttel, all of Germany

[73] Assignee: Bayer Aktiengesellschaft, Leverkusen, Germany

[21] Appl. No.: 08/878,309

[22] Filed: Jun. 18, 1997

[30] Foreign Application Priority Data

Jun. 24, 1996 [DE] Germany .......................... 196 25 093

[51] Int. Cl.⁷ .............................. B01D 47/00; B01J 8/00; C01B 3/00; C01B 3/26
[52] U.S. Cl. ...................... 423/210; 423/235; 423/245.1; 423/245.2; 423/245.3; 423/246; 423/247; 423/248; 423/351; 423/359; 423/414; 423/415.1; 423/418.2; 423/648.1; 423/650; 423/651; 423/652; 423/653; 423/654; 423/655; 423/656
[58] Field of Search .................. 95/96, 140; 423/418.2, 423/650, 651, 652, 653, 654, 655, 656, 359, 415.1, 210, 235, 245.1, 245.2, 245.3, 246, 247, 248, 351, 414, 648.1; 518/702, 703, 704; 252/372, 373, 374

[56] References Cited

U.S. PATENT DOCUMENTS

| | | | |
|---|---|---|---|
| 4,836,833 | 6/1989 | Nicholas et al. | 55/16 |
| 4,981,669 | 1/1991 | Pinto | 423/359 |
| 5,073,356 | 12/1991 | Guro et al. | 423/415 A |
| 5,102,645 | 4/1992 | Fisher et al. | 423/415 |
| 5,124,140 | 6/1992 | Okada et al. | 423/650 |
| 5,234,472 | 8/1993 | Kirshnamurthy | 95/98 |

FOREIGN PATENT DOCUMENTS

| | | | |
|---|---|---|---|
| 291857 | 11/1988 | European Pat. Off. | C01B 3/34 |
| 307843 | 3/1989 | European Pat. Off. | C01B 3/50 |
| 476656 | 3/1992 | European Pat. Off. | C01B 31/18 |
| 583981 | 2/1994 | European Pat. Off. | C01B 3/56 |
| 4236263 | 4/1994 | Germany | C01B 3/50 |

OTHER PUBLICATIONS

Berninger, R., "Advances in Low–Temperature $H_2$/CO Separation"; Linde Reports from Technik und Wissenschaft, 62/1988 (month unavailable).

(List continued on next page.)

*Primary Examiner*—Steven P. Griffin
*Assistant Examiner*—Eileen E. Nave
*Attorney, Agent, or Firm*—Joseph C. Gil; Noland J. Cheung; Lyndanne M. Whalen

[57] ABSTRACT

The present invention is directed to a process for simultaneously obtaining pure carbon monoxide and pure hydrogen in a steam reformer plant for hydrogen or ammonia generation, having a primary reformer, a secondary reformer and downstream thereof, a CO conversion stage. A part gas stream of the synthesis gas stream, which is discharged from the secondary reformer having a CO content of between 2 and 20 mol. % and is at a temperature of from 200 to 500° C. and a pressure between 15 and 50 bar, is removed between the secondary reformer and the CO conversion stage. The part gas stream is then is cooled to a temperature below 100° C., thereby condensing out the major part of the steam contained in the gas stream. The remaining raw synthesis gas stream is then guided by way of a multistage gas separation plant in which the gas components $H_2$, residual steam, $CH_4$, $CO_2$ and optionally $N_2$ are separated, either individually or together, from the CO. The separated gas components are then compressed to a pressure which exceeds the pressure in the CO conversion stage and are recombined to form a mixed gas stream. The mixed gas stream is then guided into the CO conversion stage of the steam reformer after being heated to a temperature of from 200 to 500° C. The remaining pure CO fraction is removed in separate manner and may optionally, be supplied for further processing.

11 Claims, 2 Drawing Sheets

OTHER PUBLICATIONS

Tindall, Crews, Alternative Technologies to Steam–Methane Reforming'; Hydrocarbon Processing Nov. 1995, p. 75, et seq.

Lembeck, M.; "The Linde Ammonia Concept (LAC)", Linde Report from Technik und Wissenschaft 74/1994 (month unavailable).

Patent Abstracts of Japan, vol. 16, No. 29 (C–0904), Jan. 24, 1992 & JP 03 242302 A (Mitsubishi Kakoki Kaisha Ltd), Oct. 29, 1991.

PROCESS FOR OBTAINING CARBON MONOXIDE AND HYDROGEN

FIELD OF THE INVENTION

The invention is based on a process for simultaneously obtaining pure carbon monoxide and hydrogen by the further processing of a synthesis gas stream comprising the gas components $H_2$, $H_2O$ vapor, $CH_4$, $CO_2$, CO and optionally, $N_2$. The present invention results in the use of pure CO, in particular, as a basic material for synthesis in isocyanate, ethanoic acid or methyl methacrylate production.

BACKGROUND OF THE INVENTION

A number of processes exist which generate synthesis gases ($CO/H_2$ mixtures) of varying composition from fossil raw materials, for example, for synthesis of methanol or ammonia. When natural gas is the raw material used, steam reforming is the most widely-used process. This process is used at particularly high capacities to supply synthesis gas for ammonia plants. Natural gas ammonia plants provide the greatest proportion of the world's ammonia capacity. The actual high-pressure ammonia synthesis requires, as a feed gas, an $N_2/H_2$ mixture adjusted to be virtually stoichiometric (1:3). An ammonia synthesis plant is generally linked closely, in terms of raw materials and energy, with the steam reformer upstream, which must exclusively produce a hydrogen-rich synthesis gas having a corresponding stoichiometric nitrogen content. The entire process is oriented towards this target. The oxides of carbon (CO, $CO_2$), which are of necessity, present in various process stages of the reformer as a result of use of natural gas, actually represent incidental constituents which are undesired in terms of the process objective. The existence of such undesired constituents is remedied in that the CO, which is present in the raw synthesis gas after the reforming process, is reacted catalytically with steam to form $H_2$ in high-temperature and low-temperature conversion. As a result, in terms of the process objective, CO is finally reused in hydrogen or ammonia production. The $CO_2$, which arises, is a low-energy (low-value) by-product. Some of the $CO_2$ can frequently be sold as a product, but generates less value on a market, which is generally limited regionally, for example, for the beverages industry. The situation is favorable in ammonia synthesis plant sites, wherein urea synthesis plants, which uses $CO_2$ as a raw material, are also operating. However, in the majority of ammonia plant sites, sizeable proportions of the $CO_2$ are generally discharged to atmosphere as surplus, thus, adding to environmental pollution. Because ammonia plants are operated economically only at high tonnages, emission of exceedingly large volumes of $CO_2$ may result, depending on the plant.

In contrast with other synthesis gas generation processes based on natural gas, the secondary reformer in ammonia steam reformers is fired directly with air for combustion, wherein the nitrogen contained in the air simultaneously introduces into the synthesis gas to be produced, the synthesis component for ammonia synthesis.

In the chemical industry, pure CO is required for the production of ethanoic acid, methyl methacrylates and isocyanates, etc., wherein compliance of its hydrocarbon and hydrogen contents with defined specifications, is a requirement.

A number of processes are known for CO production, their basic structure for reasons of economics being generally oriented specifically towards generating solely CO. Thus, for example, reformers can be used which, in the reformer stage, work towards obtaining the desired CO by means of a $CO/H_2$ ratio, which is adjusted higher, for example, by means of partial oxidation of natural gas with oxygen. When natural gas undergoes partial oxidation, no steam is used, thus, the amount of hydrogen imported into the synthesis gas is less when used in the ammonia steam reformer. Such a process is described in Berninger (Berninger, R., "Advances in Low-Temperature $H_2/CO$ Separation"; *Linde Reports from Technik und Wissenschaft*, 62/88).

In this process, natural gas is converted by partial oxidation with oxygen into a relatively CO-rich $CO/H_2/CO_2/$ steam mixture from which the $CO_2$ and steam are subsequently removed in an adsorber station. The hydrogen purity required is 98%. The CO contained in the hydrogen is condensed out in two stages by applying low temperatures. Alternatively, the gas separation could also be carried out by means of membrane technology or PSA technology (=pressure swing adsorption). The important factor, in order to be able to use the described technology, is that no nitrogen is present in the synthesis gas to be separated.

A further process described in Berninger works with a $CO_2$ reformer, wherein the natural gas is reacted with $CO_2$ instead of with steam, resulting in a more carbon-rich (CO-rich) synthesis gas.

Also, in such processes, by returning $CO_2$ from the process stages, which are installed downstream into the partial oxidation reactor, the proportion of carbon or CO in the product from the partial oxidation reactor is increased, with a view to obtaining a product as rich as possible in CO for the subsequent gas separation.

Depending on the hydrogen required in addition to the CO which is to be produced on the relevant site, it is possible, using the described technologies, to adjust the hydrogen/CO ratio in the synthesis gas within certain limits. However, hydrogen always arises in CO production, and it must frequently also be discharged to the atmosphere or can be used only as a combustible gas and not as a raw material. If pure hydrogen is also to be obtained in addition to the pure CO, it is necessary, for physical reasons, to install an $H_2$ purification facility downstream, for example using a PSA plant.

In Tindall (Tindall, Crews, "Alternative Technologies to Steam-Methane Reforming"; *Hydrocarbon Processing*; November 1995, P. 75, et seq.), other alternative processes for steam reforming are described having the objective of $H_2/CO$ production, steam-methane reforming (SMR), optionally combined with an oxygen secondary reforming stage (SMR/O2R), autothermic reforming (ATR) and thermic partial oxidation (POX). These processes differ in feed gas type and in the use or lack of use of a catalyst, for instance POX, which works without a catalyst. The feature common to all the processes is that they are able to generate both hydrogen and also CO in the form of a mixture or separately, provided that corresponding gas separation processes are installed downstream. When it is desired to produce CO alone, the disadvantage of all of these processes is that only a certain $CO/H_2$ ratio can be adjusted. When producing CO by itself, one standard reaction to hydrogen always occurs. In addition, a separate single or multistage reformer stage is required.

The $H_2/CO$ ratio, which is obtainable and is determined by the process, is as follows for the above-mentioned processes: SMR: 3–5; SMR/O2R: 2.5–4; ATR: 1.6–2.65; POX: 1.6–1.8. When subsequent gas separation directed towards CO as the desired product is carried out, there always co-arises a hydrogen-rich fraction of a generally even lower quality. A further disadvantage of the processes having $H_2/CO$ ratios in the synthesis gas which are in themselves favorable in terms of CO generation is that oxygen, which is costly, must be used as an oxidant. The POX process, which has the most favorable $H_2/CO$ ratio in terms of CO generation, has the additional disadvantage that soot is produced due to the high partial oxidation temperatures of the natural gas/oxygen mixture, and this reduces the carbon yield, calculated on natural gas used.

The $CO/H_2$ ratio of the synthesis gas from the reformer plant can also be displaced in the direction of CO by recycling $CO_2$ from the plant into the reformer or using imported $CO_2$ in the reformer. However, because of the reaction equilibrium in the reformer, there always remains a hydrogen-rich fraction corresponding to the imported $CO_2$, which is per se undesirable, and reduces the raw material utilization ratio of the natural gas used as feedstock.

In U.S. Pat. No. 4,836,833, a process is described for separating a synthesis gas derived from a reformer, in which the two target components CO and $H_2$ are separated through semi-permeable membranes and a PSA plant. This generates a hydrogen fraction of 99 mol. % hydrogen. The CO stream generated simultaneously is only 85 mol. % pure.

The process has the disadvantage that CO purity is inadequate for many chemical processes (for example isocyanate production), thus necessitating the installation of a further working-up stage downstream for the CO fraction. CO can, moreover, never be generated as the sole product.

In EP 291,857, a process to produce carbon monoxide is described in which $CO_2$ and $H_2$ are returned into a heat-integrated, reversed water gas conversion reaction in which additional carbon monoxide is generated.

U.S. Pat. No. 5,102,645 describes a CO generation process in which there is generated from a reformer, a more highly concentrated CO fraction in which to carry out a more effective gas separation. The reformer comprises a primary and a secondary reformer. Imported and recycled $CO_2$ are passed with the hydrocarbon feed into the primary reformer. This primary reaction product is then fed together with oxygen into a secondary reformer, with a carbon monoxide fraction being generated in an autothermic secondary reaction. This fraction has a lower hydrocarbon concentration than that discharged from the primary reformer. The gas, which is returned from the secondary reformer, has a high CO content, such that the subsequent low-temperature gas separation is able to generate a highly pure CO fraction at a lower cost.

Such interventions, in particular, recycling $CO_2$ into a classic ammonia plant, run counter to the primary objective of generating a hydrogen-rich synthesis gas fraction and run the risk of compromising the operation of the ammonia plant. All of the processes described interfere in some manner with the operation of the reformer, such that continued operation, which is free of disruption is no longer possible under the original operating conditions.

In Lembeck (Lembeck, M.; "The Linde Ammonia Concept (LAC)", *Linde Reports from Technik und Wissenschaft*; 72/1994), an alternative concept for ammonia generation is described, which differs from the classic ammonia plant. In particular, a secondary reformer fired directly with natural gas and air for combustion is dispensed with and the necessary nitrogen, which is produced separately in an air separating plant and then admixed into the reformer plant for ammonia synthesis is operated completely for hydrogen generation. No CO generation, let alone pure CO generation, is provided in this new ammonia concept.

In DE 4,236,263, a process for generating a high-purity hydrogen stream and a high-purity CO stream from a synthesis gas deriving from a steam reformer is disclosed.

The crux of this process is the generation of a high-purity hydrogen fraction in a PSA plant downstream of the steam reformer, wherein the PSA plant exhaust gas stream is further compressed and is supplied to a multistage membrane separation plant where a pure CO gas stream is obtained.

Disadvantages of the process are that the synthesis gas stream to be processed must not contain nitrogen (as it does in ammonia plant). A further crucial disadvantage in terms of generating high-purity CO is that the pure CO discharged from the membrane separation plant contains virtually all of the methane, which is not acceptable, for example, for isocyanate production. In order to use such a gas for isocyanate production, for example, it is necessary to install a further costly purification step (for example, an additional reformer step) in order to bring down the $CH_4$ concentration in the CO to the required specification values of <50 ppm $CH_4$ content. Furthermore, this process, like all the other processes described, necessitates the use of a separate reformer for the CO production and produces a hydrogen fraction for which a use must be found, when the process objective lies in generating CO alone.

Furthermore, coke gasification plants are known for producing pure CO, and these are able to generate a very pure, virtually hydrogen-free, low-methane CO by gasifying coke with $CO_2$ and oxygen. These processes, however, have the disadvantage of representing obsolete technology with a high level of handling of solids, high costs, and manual labor with potentially considerable working difficulties. Oxygen is moreover, needed for the gasification.

A feature common to all the processes for obtaining pure CO by reforming, partial oxidation with subsequent gas separation (by PSA, low-temperature separation, adsorption, etc.) is the orientation of the primary process specifically towards the requirements of CO generation and the necessity for a separate reformer plant for obtaining CO, and moreover, the tolerance of only low nitrogen contents, which derive from the natural gas.

Hydrogen of generally lower purity arises unavoidably—and this cannot be prevented from the point of view of the requirement for CO alone—and in most cases can be used only for energy or must even be discharged to the atmosphere. Most chemical manufacturing sites, however, already have at their disposal NaCl or HCl electrolysis supplying sufficient high-quality hydrogen for hydrogenation. A further disadvantage of the processes described is that, without the installation of additional fine purification stages, generation of pure CO with the aid of gas separation is at the expense of the purity of the separated hydrogen such that, using such prior art gas separation, the generation of pure CO and pure hydrogen in parallel is either impossible or is possible only at great expense.

SUMMARY OF THE INVENTION

The present invention is directed to a process for simultaneously obtaining pure carbon monoxide and hydrogen by the further processing of a synthese gas stream comprising the gas components $H_2$, $H_2O$ vapor, $CH_4$, $CO_2$, CO and optionally, $N_2$. In particular, the process of the present invention comprises a process wherein the steps are: a) removing between the secondary reformer and the CO conversion stage, a part gas stream of said synthesis gas stream discharged from the secondary reformer, which has a CO content of between 2 and 20 mol. %, preferably between 5 and 10 mol. %, and is at a temperature of from 200 to 500° C. and a pressure within the range 15 to 50 bar, in a steam reformer plant for hydrogen or ammonia generation, having a primary reformer, a secondary reformer and downstream thereof, a CO conversion stage; b) cooling said part gas stream to a temperature below 100° C., thereby condensing out the major part of the steam contained in said part gas stream resulting in a raw synthesis gas stream; c) guiding said remaining raw synthesis gas by way of a multistage gas separation plant in which said gas components $H_2$, residual $H_2O$, $CH_4$, $CO_2$ and optionally $N_2$ are separated, either individually or together, from the CO; d) compressing the gas components $H_2$, $CH_4$ and optionally $N_2$ from the CO, which are separated from the CO, by compressing said gas components to a pressure which exceeds the pressure in said CO conversion stage and are recombined to form a mixed gas stream; e) heating said mixed gas stream to a temperature from 200 to 500° C. and supplying said mixed gas stream to said CO conversion stage of said steam reformer plant; and f) removing the remaining pure CO fraction in a separate manner and optionally, supplying said remaining pure CO fraction to further processing.

"Steam reformer" in this context is understood to be a plant for generating ammonia synthesis gas or hydrogen, which encompasses at least a primary reformer, a secondary reformer and a CO conversion stage.

Therefore, in the process according to the present invention, the $CH_4$ reformer of an ammonia plant or of a different steam reformer plant, which is oriented principally towards the obtaining of hydrogen is co-used for obtaining CO, such that a simultaneous CO and hydrogen generation is conducted in the steam reformer plant, without impairing the ammonia or hydrogen generation process, and no separate reformer or other plant must be set up and utilized for obtaining the pure CO.

The object of the invention is therefore to develop a process for obtaining simultaneously and in a separate manner, pure carbon monoxide, without unavoidable hydrogen impurities arising and hydrogen, which has low capital and operating costs. Additionally, the process exhibits an extremely low raw material usage at a high raw material utilization ratio in terms of the natural gas feedstock, calculated on both of the target products CO and hydrogen, and has considerably less environmental impact than known processes. Furthermore, the process must fit into the raw materials balance of typical chemical manufacturing sites.

DETAILED DESCRIPTION OF THE INVENTION

The process according to the present invention encompasses the following more closely defined process steps:
a) the part gas stream cooled to below 100° C. is supplied to a $CO_2$ separation stage;
b) the part gas stream from which $CO_2$ has been removed is guided through a hydrogen separation stage in which one or a plurality of hydrogen-rich gas fraction(s) is/are separated;
c) the part gas stream remaining downstream of the hydrogen separation stage is then purified of traces of $CO_2$ and water;
d) the part gas stream from which traces of $CO_2$ and water have been removed is separated in a CO separation stage into a pure CO product gas stream and a methane-nitrogen residual gas mixture;
e) the hydrogen-rich gas fractions and the nitrogen-methane residual gas mixture are compressed, either separately or together, to a pressure which exceeds the pressure in the CO conversion stage of the steam reformer and are combined to form a water-free, low-CO mixed gas stream;
f) the latter mixed gas stream is heated to a temperature of from 200 to 500° C. and is fed into the CO conversion stage of the steam reformer plant.

Heating of the mixed gas stream to temperatures of from 200 to 500° C. occurs expediently in a countercurrent heat exchanger, which is used simultaneously for cooling the part gas stream which is removed between the secondary reformer and the CO conversion stage to temperatures below 100° C.

In order to separate the $CO_2$ from the part gas stream cooled to below 100° C., the $CO_2$ in the $CO_2$ separation stage is advantageously scrubbed using a potash solution or is removed using a selective $CO_2$ wash having amines as the selective solvent.

A (known) PSA plant (pressure swing adsorption plant) can be utilized as the hydrogen separation stage for separating the hydrogen-rich gas fraction(s) from the $CO_2$-free part stream.

The remaining part stream is separated in the CO separation stage by a low-temperature rectification into a pure CO product gas stream and a nitrogen-methane residual gas mixture.

In the part gas stream, which branches off between the secondary reformer and the CO conversion stage, the process according to the invention is preferably carried out such that the ratio between the main gas volume flow which is guided further downstream of the secondary reformer and the branched-off part flow volume is between 1:1 and 4:1.

Figure 1:
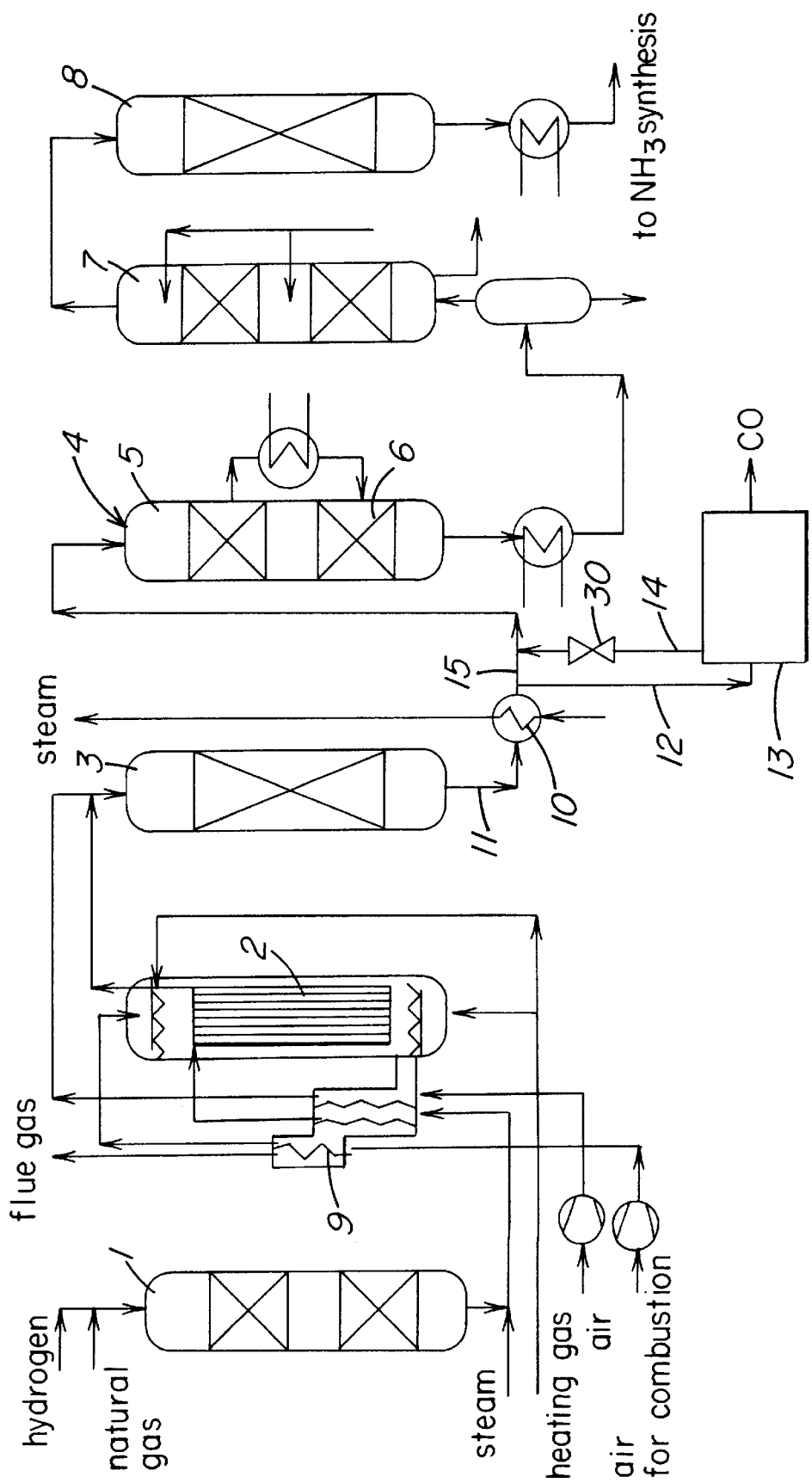
FIG. 1 shows a schematic flow chart of a plant for carrying out the process according to the present invention having a conventional steam reformer plant for ammonia generation in the main stream and a CO preparation and separation plant operated in the side stream, with return of the hydrogen-rich residual gases into the main stream.

In the process according to the present invention, as a result of the branching-off and outward transfer of some of the CO upstream of conversion, hydrogen is lost in the shift reactors of the CO conversion stage, because less CO is available for the conversion of CO and water to hydrogen and $CO_2$. Therefore, an important complementary feature of the process according to the present invention lies in the fact that the volume of CO gas, which is transferred out by way of the part stream, which is, hence, in deficit in terms of the stoichiometric operation of the CO conversion stage in accordance with the reaction equation $CO+H_2O \rightarrow CO_2+H_2$, is compensated by a slightly increased supply of the natural gas feedstock into the primary reformer. This only slightly increased supply of natural gas into the primary reformer, which secures the raw material requirement for CO generation, represents an important complementary feature of the invention. The conventional steam reformer plant for ammonia generation comprises, according to FIG. 1, the following process stages natural gas desulphurization 1, primary reformer 2 heated indirectly with fuel, secondary reformer 3 fired directly with natural gas and air for combustion, CO converter 4 having the HT shift reactor 5 and LT shift reactor 6, $CO_2$ absorber 7 and methanization reactor 8. The feeds preheated in the heat exchanger 9, that is to say desulphurized natural gas comprising principally methane, and steam and air are supplied to the primary reformer 2. In addition, the primary reformer 2 is supplied with the necessary heating gas and the air for combustion for indirect firing. The hot reaction gases discharged from the primary reformer 2 are then guided into the autothermically operating secondary reformer 3 in which a further catalytic reaction to CO takes place, such that on discharge from the secondary reformer there is present only a very low methane concentration. Pre-heated air (oxygen) is likewise supplied to the secondary reformer 3. The synthesis gas discharged from the secondary reformer 3 is supplied by way of a heat exchanger 10 to the CO conversion stage 4 having the shift reactors 5 and 6 in which CO is converted catalytically with the steam still present to $CO_2$ and $H_2$ by the water gas reaction. The $CO_2$ is then scrubbed in the absorber 7, and the remaining hydrogen-rich gas is supplied to the methanization stage 8 in which the residual methane is converted with CO to $H_2$ and $CO_2$. The reaction stages described are known in steam reformer plant for ammonia or $H_2$ generation and consequently constitute prior art.

An essential process step which deviates from the prior art now comprises branching off from the secondary reformer product stream 11 downstream of the heat exchanger 10 a raw synthesis gas part stream 12 comprising principally $H_2$, $H_2O$ vapor, methane, CO, $CO_2$ and sizeable quantities of nitrogen, which is supplied to a multistage CO separation plant 13, and, after compression and heating, recombining the remaining, CO-free, gas mixture comprising substantially $H_2$, $CH_4$ and $N_2$, which is the mixed gas stream 14, with the main synthesis gas stream 15 which remains after separation of the part stream 12 and which flows to the CO conversion stage 4.

Figure 2:
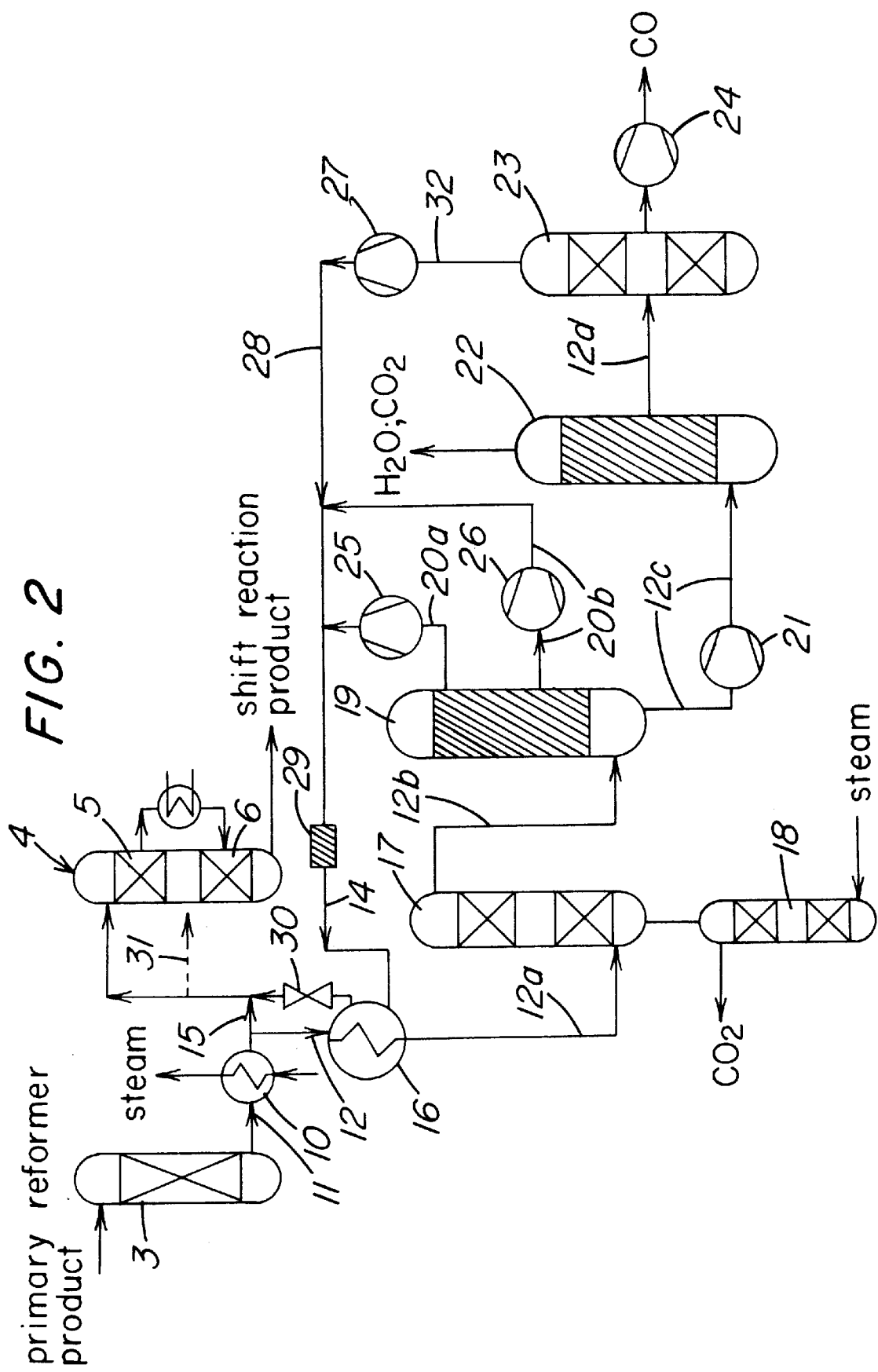
FIG. 2 shows a flow chart with detailed section of the steam reformer plant and the CO preparation and separation plant parts of the present invention which branch off therefrom.

The individual gas components $H_2O$ vapor, $CO_2$, $H_2$, traces of $H_2O$, $CO_2$ and $N_2$ in part gas stream 12 are separated from the CO in accordance with FIG. 2 with the aid of individual separation stages which are known per se. Thus, the hot part gas stream which is removed from the main stream 11 downstream of the secondary reformer 3 and is at a temperature of from 200 to 500° C. is cooled by a countercurrent heat exchanger 16 on the cooling medium side whereof there impinges the mixed gas stream 14 which is to be heated and introduced into the conversion stage 4. The majority of the steam contained in the part stream 12 thereby condenses out.

The cooled part gas stream 12a from which water has been removed is then guided into a $CO_2$ separation stage 17 in which there takes place a selective $CO_2$ absorption in organic amines or a chemisorption in a potash solution. The loaded potash solution or amine solution is supplied to a desorption stage 18 installed downstream in which the $CO_2$ is stripped.

The cooled part stream 12b from which $CO_2$ has been removed is now guided for separation of the hydrogen into a pressure swing adsorption plant 19 (PSA plant) which delivers a plurality of pure hydrogen fractions 20a, 20b at different pressures. Such PSA plants are conventional commercial plant components (for example, Linde, Germany).

The hydrogen-free part gas stream 12c which remains after the PSA plant 19 is compressed (compressor 21), and any traces of $CO_2$ and steam still present are removed in the zeolite adsorber column 22 downstream.

The gas stream 12d present on discharge from the zeolite absorber column 22, which now comprises only CO and a nitrogen/methane residual gas mixture, is supplied to a low-temperature rectification stage 23 for further processing. In this process step, the CO gas stream is separated and is compressed to the desired user pressure by means of the compressor 24.

The hydrogen fractions 20a and 20b arising in the PSA plant 19 and the nitrogen/methane residual gas mixture 32 separated in the low-temperature rectification stage 23 are compressed by means of the pressure-controlled compressors 25, 26 and 27 to a higher common pressure level and are combined in the return line 28 by the static mixer 29 to form a mixed gas stream 14. The mixed gas stream 14 is reheated in the countercurrent heat exchanger 16 to temperatures of from 200 to 500° C., as described above, and is then fed back by way of the nozzle 30 upstream of the CO conversion stage 4 of the steam reformer plant into that portion 15 which was not circulated out of the raw synthesis gas stream 11 discharged from the secondary reformer 3. Alternatively, the mixed gas stream 14 can also be injected into the CO converter 4 between the HT shift stage 5 and the LT shift stage 6 by way of the line 31. With the exception of the steam which is separated in the heat exchanger 16 and the $CO_2$ arising in the desorption stage 18, and the CO pure gas stream obtained in the low-temperature rectification stage 23, therefore, all the gas fractions cleaved off in the CO separation plant 13 are recycled into the main stream of the steam reformer plant.

By circulating out from the raw synthesis gas stream 11 a part stream 12 which corresponds to the CO volume required, and feeding it back, virtually free of CO, $CO_2$ and water, upstream of or into the CO converter 4, the raw synthesis gas is correspondingly depleted as to CO upstream of the shift reactors 5 and 6 in the CO converter 4. This results in underloading of the shift reactors 5 and 6 and consequently in a loss of hydrogen during conversion for which the reaction equation is:

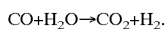

$$CO+H_2O \rightarrow CO_2+H_2.$$

This disadvantage, however, is eliminated, as described below, by slightly increasing the supply of the natural gas feedstock into the primary reformer 2. An expansion valve can be used as an alternative to the nozzle 30.

The invention is further illustrated but is not intended to be limited by the following examples in which all parts and percentages are by weight unless otherwise specified.

EXAMPLES

Example 62,000 tons p.a. pure CO are to be produced with the aid of the process according to the invention. The ammonia reformer according to FIG. 1 has a capacity of 110,000 $Nm^3/h$ ammonia synthesis gas having a stoichiometric ratio of $N_2/H_2$ of 1:3. A pure CO gas stream of 62,000 tons p.a is additionally to be generated with the aid of the process according to the invention.

The raw synthesis gas stream 11 which is present downstream of the secondary reformer 3 has the following composition:

| | |
|---|---|
| $H_2O$: | 35 vol. % |
| $CO_2$: | 4 vol. % |
| CO: | 8 vol. % |
| $N_2$: | 15 vol. % |
| $H_2$: | 35.5 vol. % |

| | |
|---|---|
| CH$_4$: | 2 vol. % |
| noble gases: | 0.5 vol. % |

It can be seen that the CO concentration is very low and represents little more than an impurity. It is a particularity of the process according to the present invention that even under these conditions, it is possible to achieve economic pure CO generation. The raw synthesis gas stream 11 is then divided into the two part streams 12 and 15 in a ratio of 1:2 corresponding to the desired pure CO volume. The larger part stream 15 of approximately 140,000 Nm$^3$/h raw synthesis gas which is at a temperature of 350° C. and a pressure of 30 bar is guided in conventional manner in the direction of the HT shift stage 5 of the ammonia reformer, while the second part stream 12 of approximately 75,000 Nm$^3$/h is cooled to 50° C. in the countercurrent heat exchanger 16. This condenses out 95% to 98% of the water contained in the raw synthesis gas. The medium to be heated on the opposite side in the heat exchanger 16 is the water-free, low-CO mixed gas stream 14 which is recycled from the CO separation stage 13 into the ammonia reformer. After the raw synthesis gas part stream 12 has been cooled, the low-water part stream 12a is transferred according to FIG. 2 into the CO$_2$ scrubber 17 which operates on the potassium carbonate process, where the main quantity of the CO$_2$ contained in the raw synthesis gas is removed by chemisorption. The loaded potash solution is thermally regenerated in the desorption stage 18 and the stripped CO$_2$ is supplied to a further use. The part stream 12b, from which the (majority of the) H$_2$O and the CO$_2$ have now been removed, is then supplied to the hydrogen-PSA plant 19, where virtually complete removal of hydrogen from the latter gas stream occurs. The hydrogen-PSA plant 19 delivers a high-pressure and a low-pressure hydrogen fraction 20a and 20b. The part stream 12c which remains, thereafter, now comprises CO, N$_2$, CH$_4$ and traces of noble gas and still contains additionally, traces of CO$_2$ and water. The latter components are removed from the part stream 12c in the zeolite adsorber stage 22 installed downstream of the hydrogen-PSA plant 19. The part stream 12d, which is present downstream of the zeolite adsorber stage 22 is then supplied to the low-temperature rectification stage 23 where liquefaction/separation of the CO takes place, while N$_2$ and CH$_4$ are contained in the gas stream 32, which passes over. An essential step now comprises, by intermediate compression by means of the compressors 25, 26 and 27, bringing to the same pressure level which exceeds that in the HT shift reactor 5, the part gas streams 20a, 20b and 32 which were discharged from the two separation stages 19 and 23; combining them in the static mixer 29 to form the mixed gas stream 14; bringing the mixed gas stream 14 then to a temperature of approximately 330° C. in the countercurrent heat exchanger; and feeding it back and mixing it by way of the nozzle 30 into the main synthesis gas stream 15 directly upstream of the CO converter 4 of the ammonia reformer. The part streams 20a, 20b, 32 are compressed to the extent of the pressure shortfall of the part stream in question vis-à-vis the pressure of the synthesis gas main stream 15, which depends on the operating data of the PSA plant 19 and the low-temperature rectification 23, which are incidental to the achievement proposed according to the present invention.

The individual stages of the CO separation plant 13, which comprise the CO$_2$ scrubber 17, the hydrogen-PSA plant 19, the zeolite absorber stage 22 and the low-temperature rectification stage 23, are designed and operated such that there are contained in the pure CO stream<100 ppm hydrogen and<50 ppm CH$_4$, thus enabling the pure CO to be used, for example, in isocyanate production. The detail of the separation stages used is immaterial to the process according to the invention.

The process according to the invention can also be carried out in conjunction with a hydrogen-generating steam reformer not preparing the hydrogen for an ammonia plant.

The chief advantage of the process according to the present invention in all the embodiments described lies in the coupling together in synergistic manner of the hydrogen generation and the pure CO generation, such as to necessitate only extremely low utilization of fossil raw materials (natural gas) for the additional preparation of large volumes of pure CO.

In a conventionally operated ammonia reformer having a 100% hydrogen conversion the natural gas processing takes place according to the following reaction equations:

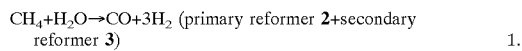
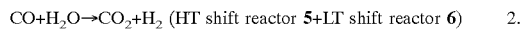

in sum: CH$_4$+2H$_2$O→CO$_2$+4 H$_2$ (overall reaction)

This means that the ammonia reformer produces gross 4 mole H$_2$ per mole CH$_4$. If, now, some of the CO is transferred out upstream of conversion and is separated out of the raw synthesis gas, then this results in a hydrogen loss in the shift reactors of the CO converter because less CO is available for the reaction. In order, however, to maintain the stoichiometric ratio of N$_2$:H$_2$ of 1:3 desired for ammonia synthesis, this hydrogen deficit must be compensated by an increase in the natural gas feedstock to the primary reformer 2. Whereas, however, in the CO converter 4, there is a deficit of one mole H$_2$ in the ammonia synthesis gas for every mole of "lost CO" resulting from pure CO generation, 4 moles H$_2$ can be supplemented by a boost of only 1 mole CH$_4$ into the primary reformer 2. In other words, for the additional pure CO generation at the steam reformer of the ammonia plant, approximately 25% of the natural gas feedstock is required, which would be required, if CO were to be produced in a separate reformer or another plant for synthesis gas generation. This is quite a considerable advantage of the process according to the present invention.

If this separate reformer were operated with a CH$_4$/CO$_2$ mixture, although the carbon balance of this competing achievement of the object of the invention would be improved somewhat, the fundamental advantage of the process according to the invention would remain. The generation according to the invention of pure CO in conjunction with a steam reformer for ammonia or hydrogen generation minimizes the usage of natural gas, thus, sparing resources and guaranteeing low operating costs. From an environmental point of view, it is advantageous that the carbon difference between the CO volume transferred out downstream of the secondary reformer 3 and the quantity of natural gas boosted into the primary reformer 2 as a supplement to compensate the hydrogen balance no longer appears as a CO$_2$ emission to atmosphere from the ammonia plant. In the present Example, this means a reduction in CO$_2$ emissions of approximately 80,000 tons p.a. A further process engineering advantage of the process according to the present invention is that the ammonia reformer and the ammonia synthesis downstream of the CO converter 4 are not at all influenced by the obtaining of CO according to the present invention, in terms of either volume flow or gas composition. Only the $CO_2$ scrubbing stage 7 of the steam reformer can be operated at a lower capacity, which has an advantageous effect on its steam consumption. Further advantages of the process according to the invention are that the operating personnel present for operating the ammonia plant or the steam reformer can supervise CO generation as well, such that no additional manpower is needed for CO production, thus, further increasing the economy of the process according to the present invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for simultaneously obtaining pure carbon monoxide and pure hydrogen by the further process of a synthesis gas stream comprising the gas components $H_2$, $H_2O$ vapor, $CH_4$, $CO_2$, CO and optionally $N_2$, comprising the following steps:

a) in a steam reformer plant for hydrogen or ammonia generation, having a primary reformer, a secondary reformer and downstream thereof, a CO conversion stage, removing between the secondary reformer and the CO conversion stage, a part gas stream of said synthesis gas stream discharged from the secondary reformer, which has a CO content of between 2 and 20 mol. % and is at a temperature of from 200 to 500° C. and a pressure within a range of 15 to 50 bar;

b) cooling said part gas stream to a temperature below 100° C., thereby condensing out the major part of steam contained in said part gas stream resulting in a raw synthesis gas stream;

c) guiding said remaining raw synthesis gas by way of a multistage gas separation plant in which said gas components $H_2$, residual $H_2O$, $CH_4$, $CO_2$, CO and optionally $N_2$ are separated, either individually or together, from the CO;

d) compressing the gas components $H_2$, $CH_4$ and optionally $N_2$ from the CO, which are separated from the CO, by compressing said gas components to a pressure which exceeds the pressure in said CO conversion stage and are recombined to form a mixed gas stream;

e) heating said mixed gas stream to a temperature from 200 to 500° C. and supplying said mixed gas stream to said CO conversion stage of said steam reformer plant; and f) removing remaining pure CO fraction in a separate manner and optionally, supplying said remaining pure CO fraction to further processing.

2. A process according to claim 1, wherein a) said part gas stream cooled to below 100° C. is supplied to a $CO_2$ separation stage wherein $CO_2$ is removed;

b) said part gas stream from which $CO_2$ has been removed is guided through a hydrogen separation stage in which one or a plurality of hydrogen-rich gas fractions are separated;

c) said part gas wherein one or a plurality of hydrogen-rich gas fractions are separated remaining downstream of the hydrogen separation stage is purified of traces of $CO_2$ and water;

d) said part gas stream wherein traces of $CO_2$ and water have been removed is separated in a CO separation stage into a pure CO product gas stream and a methane-nitrogen residual gas mixture;

e) said one or a plurality of hydrogen-rich gas fractions and said methane-nitrogen residual gas mixture are compressed, either separately or together, to a pressure which exceeds the pressure in the CO conversion stage and are combined to form a water-free, low-CO mixed gas stream; and f) said water-free, low-CO mixed gas stream is heated to a temperature of from 200 to 500° C. and is fed into said CO conversion stage after being mixed with said synthesis gas stream remaining downstream of the separation of said part stream removed between said secondary reformer and said CO conversion stage.

3. A process according to claim 2, wherein said water-free, low CO mixed gas stream is heated to temperatures of from 200 to 500° C. in a countercurrent heat exchanger which is used simultaneously to cool to temperatures below 100° C., said part gas stream removed between said secondary reformer and said CO conversion stage.

4. A process according to claim 2, wherein said $CO_2$ is scrubbed from said part stream supplied to said $CO_2$ separation stage using a potash solution.

5. A process according to claim 3, wherein said $CO_2$ is scrubbed from said part stream supplied to said $CO_2$ separation stage using a potash solution.

6. A process according to claim 2, wherein said $CO_2$ is removed from said part stream supplied to said $CO_2$ separation stage using a selective $CO_2$ wash having amines as selective solvent.

7. A process according to claim 2, wherein a PSA plant is used as said hydrogen separation stage to separate one or a plurality of hydrogen-rich gas fractions from said part stream.

8. A process according to claim 2, wherein said CO separation stage, in which said part gas stream wherein traces of $CO_2$ and water have been removed is separated into a pure CO product gas stream and a methane-nitrogen residual gas mixture, by a low-temperature rectification plant.

9. A process according to claim 1, wherein the ratio of said the main gas volume flow guided further downstream of said secondary reformer and said part gas stream removed from between said secondary reformer and said CO conversion stage is between 1:1 and 4:1.

10. A process according to claim 1, wherein volume of pure CO gas volume is compensated for by an increased supply of natural gas feedstock to the primary reformer in accordance with reaction equation $CO+H_2O \rightarrow CO_2+H_2$.

11. A process according to claim 1, wherein said part gas stream of said synthesis gas stream discharged from the secondary reformer, has a CO content of between 5 and 10 mol. %.

* * * * *